US006484272B1

(12) United States Patent
Egolf et al.

(10) Patent No.: US 6,484,272 B1
(45) Date of Patent: Nov. 19, 2002

(54) GATE CLOSE BALKING FOR FAIR GATING IN A NONUNIFORM MEMORY ARCHITECTURE DATA PROCESSING SYSTEM

(75) Inventors: David A. Egolf, Glendale, AZ (US); William A. Shelly, Phoenix, AZ (US); Wayne R. Buzby, Phoenix, AZ (US)

(73) Assignee: Bull HN Information Systems, Inc., Billerica, MA (US)

( * ) Notice: Subject to any disclaimer, the term of this patent is extended or adjusted under 35 U.S.C. 154(b) by 0 days.

(21) Appl. No.: 09/409,811

(22) Filed: Sep. 30, 1999

(51) Int. Cl.[7] .................................................. G06F 1/00
(52) U.S. Cl. ..................... 714/30; 714/738; 714/742; 714/47; 711/167; 711/168
(58) Field of Search ....................... 710/200, 240, 710/241–243, 305, 308, 316, 311; 711/167, 168, 137, 144, 145, 146; 709/216, 217, 212; 714/710, 716, 718, 730, 738, 742, 30, 37, 47

(56) References Cited

U.S. PATENT DOCUMENTS

| 5,283,870 | A | * | 2/1994 | Joyce et al. ................. 711/152 |
| 5,535,365 | A | * | 7/1996 | Barriuso et al. ............. 711/155 |
| 5,860,159 | A | * | 1/1999 | Hagersten .................... 711/151 |
| 6,047,316 | A | * | 4/2000 | Barton et al. ................ 709/216 |
| 6,128,677 | A | * | 10/2000 | Miller et al. ................. 710/40 |
| 6,247,025 | B1 | * | 6/2001 | Bacon ......................... 707/206 |
| 6,292,860 | B1 | * | 9/2001 | Cochcroft, Jr. et al. ..... 710/108 |
| 6,334,177 | B1 | * | 12/2001 | Baumgartner et al. ........ 712/13 |
| 6,393,593 | B1 | * | 5/2002 | Tsujii ......................... 714/738 |
| 6,438,722 | B1 | * | 8/2002 | Bailey et al. ............... 714/736 |

OTHER PUBLICATIONS

In Search of Clusters, 2nd Edition Author: Gregory F. Pfister,©1998 Prentice Hall.

* cited by examiner

Primary Examiner—Peter Wong
Assistant Examiner—Raymond N Phan
(74) Attorney, Agent, or Firm—J. H. Phillips; B. E. Hayden; J. S. Solakian

(57) ABSTRACT

In a NUMA architecture, processors in the same CPU module with a processor opening a spin gate tend to have preferential access to a spin gate in memory when attempting to close the spin gate. This "unfair" memory access to the desired spin gate can result in starvation of processors from other CPU modules. This problem is solved by "balking" or delaying a specified period of time before attempting to close a spin gate whenever either one of the processors in the same CPU module just opened the desired spin gate, or when a processor in another CPU module is spinning trying to close the spin gate. Each processor detects when it is spinning on a spin gate. It then transmits that information to the processors in other CPU modules, allowing them to balk when opening spin gates.

13 Claims, 9 Drawing Sheets

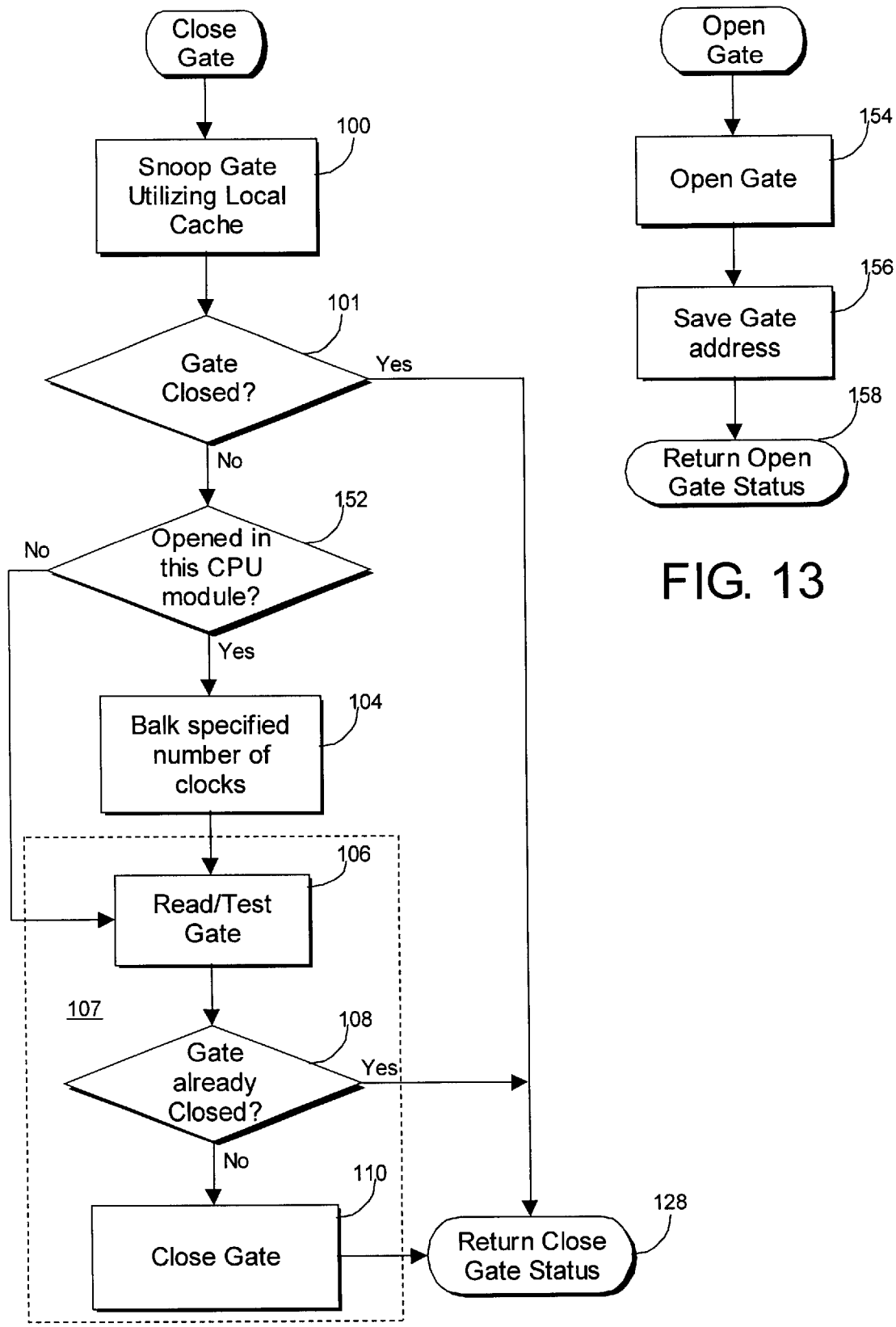

GATE CLOSE BALKING FOR FAIR GATING IN A NONUNIFORM MEMORY ARCHITECTURE DATA PROCESSING SYSTEM

CROSS REFERENCE TO RELATED APPLICATION

This application is related to our copending patent application entitled "GATE CLOSE FAILURE NOTIFICATION FOR FAIR GATING IN A NONUNIFORM MEMORY ARCHITECTURE DATA PROCESSING SYSTEM", filed of even date herewith and assigned to the assignee hereof.

FIELD OF THE INVENTION

The present invention generally relates to data processing systems, and more specifically to fair gating in a nonuniform memory access (NUMA) architecture.

BACKGROUND OF THE INVENTION

Data processing systems invariably require that resources be shared among different processes, activities, or tasks in the case of multiprogrammed systems and among different processors in the case of multiprocessor systems. Such sharing is often not obvious within user programs. However, it is a necessity in operating systems, and is quite common in utility programs such as database and communications managers. For example, a dispatch queue is typically shared among multiple processors in a multiprocessor system. This provides a mechanism that allows each processor to select the highest priority task in the dispatch queue to execute. Numerous other operating systems tables are typically shared among different processes, activities, tasks, and processors.

Data processing systems invariably require that resources be shared among different processes, activities, or tasks in the case of multiprogrammed systems and among different processors in the case of multiprocessor systems. Such sharing is often not obvious within user programs. However, it is a necessity in operating systems, and is quite common in utility programs such as database and communications managers. For example, a dispatch queue is typically shared among multiple processors in a multiprocessor system. This provides a mechanism that allows each processor to select the highest priority task in the dispatch queue to execute. Numerous other operating systems tables are typically shared among different processes, activities, tasks, and processors.

Serialization of access to shared resources in a multiprocessor system is controlled through mutual exclusion. This is typically implemented utilizing some sort of hardware gating or semaphores. Gating works by having a process, activity, or task "close" or "lock" a "gate" or "lock" before accessing the shared resource. Then, the "gate" or "lock" is "opened" or "unlocked" after the process, activity, or task is done accessing the shared resource. Both the gate closing and opening are typically atomic memory operations on multiprocessor systems.

There are typically two different types of gates: queued gates and spin gates. Semaphores are examples of queued gates. When a process, activity, or task attempts to "close" a queued gate that is already closed, that process, activity, or task is placed on a queue for that gate, and is dequeued and activated when the gate is subsequently opened by some other process, activity, or task. Queued gates are typically found in situations where the exclusive resource time is quite lengthy, especially in comparison with the time required to dispatch another process, activity, or task.

The second type of gate is a "spin" gate. When a process, activity, or task attempts to "close" a spin gate that is already closed, a tight loop is entered where the processor attempting to close the spin gate keeps executing the "close" instruction until it ultimately is opened by another processor or the processor decides to quite trying. Note that "spin" gates assume a multiprocessor system since the processor "spinning" trying to "close" the spin gate is depending on another processor to "open" the gate. Spin gates are typically found in situations where the exclusive resource time is fairly short, especially in comparison with the time required to dispatch another process, activity, or task. They are especially prevalent in time critical situations.

As noted above, the instructions utilized to open and close gates, in particular spin gates, typically execute utilizing atomic memory operations. Such atomic memory modification instructions are found in most every architecture supporting multiple processors, especially when the processors share memory. Some architectures utilize compare-and-swap instructions to "close" gates. The Unisys 1100/2200 series of computers utilizes Test Set and Skip (TSS) and Test Clear and Skip (TCS) to close and open spin gates.

The GCOS® 8 architecture produced by the assignee herein utilizes a Set Zero and Negative Indicators and Clear (SZNC) instruction to "close" a spin gate and a Store Instruction Counter plus 2 (STC2) instruction to subsequently "open" the spin gate. The SZNC sets the Zero and Negative indicators based on the current value of the gate being "closed". It then clears (or zeros) the gate. The next instruction executed is typically a branch instruction that repeats executing the SZNC instruction if the gate being closed was already clear (or contained zero). Thus, the SZNC instruction will be executed repeatedly as long as the spin gate is closed, as indicated by, having a zero value. The gate is opened by another processor by storing some non-zero value in the gate cell. In the GCOS 8 architecture, execution of the STC2 instruction to "open" a gate guarantees that the "opened" gate will contain a non-zero value.

Memory configuration in multiprocessor shared-memory systems have typically been a uniform memory configuration. Each processor has the same chance to access any given memory location, and in particular, to access any given spin gate. This results in a certain relative "fairness" in accessing the spin gate. Thus, when a spin gate is "opened", all competing processors are on essentially equal footing in "closing" the gate.

This is not the case when a Cache Coherent NonUniform Memory Access (CC-NUMA) architecture is implemented. CC-NUMA architectures are discussed in detail in "*In Search of Clusters*", Second Edition, by Gregory F. Pfister, incorporated herein by reference. "Locking" or "Gating" is discussed starting on page 179. In a CC-NUMA architecture, some processors may have a preferential access to the spin gate. For example, the spin gate may reside in high-speed cache memory for one or more processors. The processors with immediate access to the cache memory can typically gain sufficient access to the spin gate to close it, at the expense of processors without such immediate access. The result of this is that in certain situations where multiple processors are competing for ownership of a shared resource, processors with the slower access to exclusive ownership of the spin gate can be locked out for extended periods of time by processors having faster access to the shared gate. A number of different symptoms have been noticed that indicate the occurrence of this situation. For example, in certain situations different timers may expire prior to the requesting processor acquiring or successfully closing the spin gate.

A cache siphon is where the cache copy of a block of memory is moved from one cache memory to another. When more than one processor is trying to get write access to the same word or block of memory containing a gate at the same time to close the gate, the block of memory can "ping pong" back and forth between the processors as each processor siphons the block of memory containing the gate into its own cache memory in order to try to close the gate.

This potential for unfairness is exacerbated by attempts to improve the memory access of the waiting processor by first snooping the gate word in order to avoid unnecessary cache siphons. The delay introduced by the snoop can give processors in a common locality a significant time advantage for update acquisition of the cache block containing the spin gate.

It would be useful in CC-NUMA systems to have available "fair" gate opening and closing functionality so that processors with slower access to exclusive ownership of a shared resource are not frozen out by processors with faster access to the shared resource.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which:

FIG. 12 is a flowchart illustrating operation of a spin gate "close", in accordance with the invention shown in FIGS. 10 and 11; and FIG. 13 is a flowchart illustrating operation of a spin gate "open", in accordance with the invention shown in FIGS. 10 and 11.

DETAILED DESCRIPTION

Grouping processors into processor (CPU) modules, and including a shared cache memory in the CPU modules results in a NonUniform Memory Access (NUMA) architecture when multiple CPU modules share an address space and slower memories. Processors in the same CPU module with a processor opening a spin gate tend to have preferential access to the spin gate in memory when attempting to close the spin gate. This "unfair" memory access to the desired spin gate can result in starvation of processors from other CPU modules.

This problem is solved by "balking" or delaying a specified period of time before attempting to close a spin gate whenever either one of the processors in the same CPU module just opened the desired spin gate, or when a processor in another CPU module is spinning trying to close the spin gate. Each processor detects when it is spinning on a spin gate. It then transmits that information to the processors in other CPU modules, allowing them to balk when opening spin gates.

In the following description, numerous specific details are set forth such as specific word or byte lengths, etc. to provide a thorough understanding of the present invention. However, it will be obvious to those skilled in the art that the present invention may be practiced without such specific details. In other instances, circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

The term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

The term "gate" and "lock" are used interchangeably herein. The terms "close" and "lock" as applied to gates or locks are used interchangeably herein. The terms "open" and "unlock" as applied to gates or locks are used interchangeably herein. In a typical situation in a data processing system, exclusive access to a shared resource is provided by "closing" or "locking" a "gate" or "lock" before accessing the shared resource. Then, the "gate" or "lock" is "opened" or "unlocked" after accessing the shared resource, allowing another task, activity, process, or processor to access the shared resource.

Figure 1:
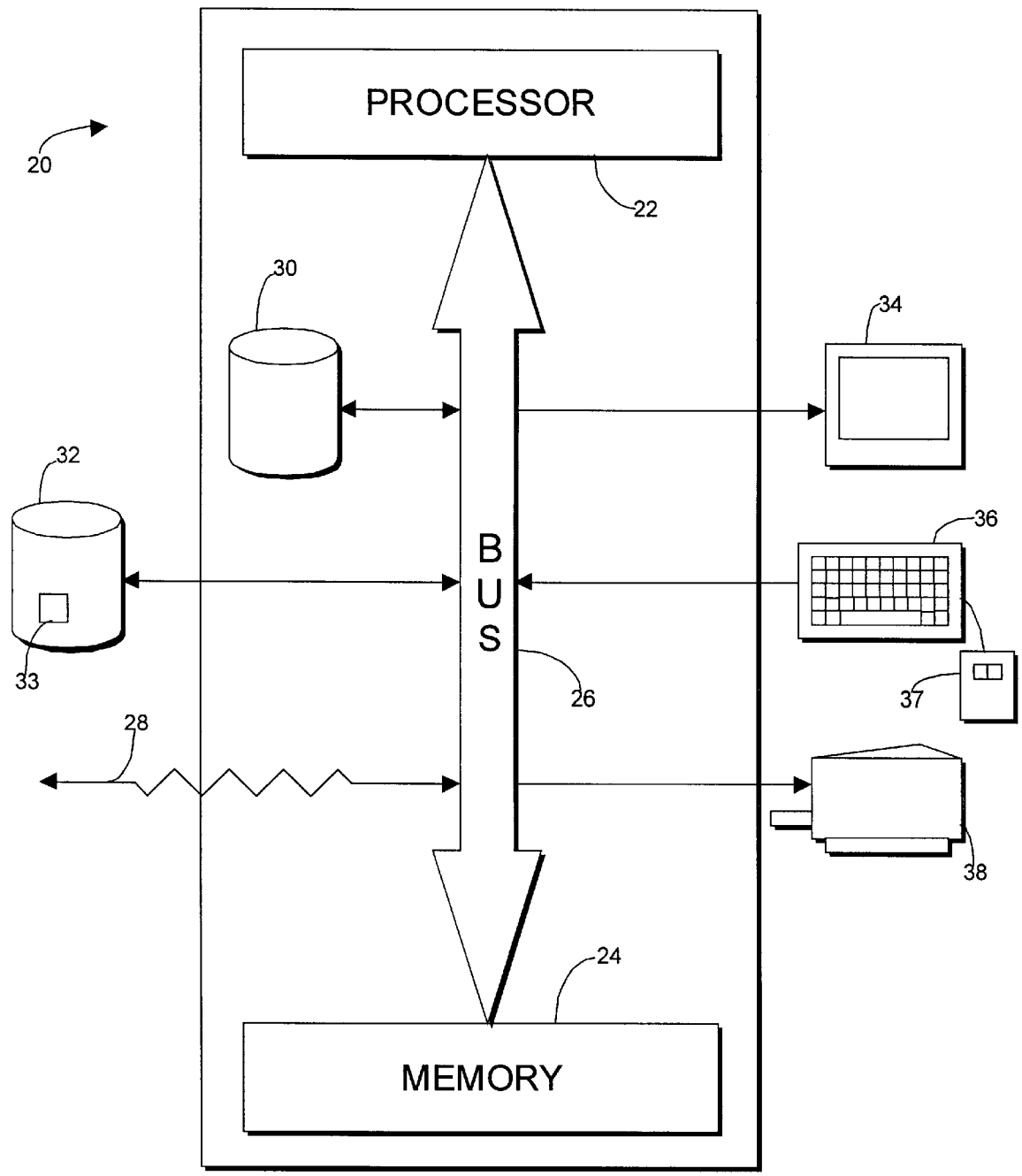
FIG. 1 is a block diagram illustrating a General Purpose Computer, in accordance with the present invention.

FIG. 1 is a block diagram illustrating a General Purpose Computer 20. The General Purpose Computer 20 has a Computer Processor 22, and Memory 24, connected by a Bus 26. Memory 24 is a relatively high speed machine readable medium and includes Volatile Memories such as DRAM, and SRAM, and Non-Volatile Memories such as, ROM, FLASH, EPROM, EEPROM, and bubble memory. Also connected to the Bus are Secondary Storage 30, External Storage 32, output devices such as a monitor 34, input devices such as a keyboard 36 (with mouse 37), and printers 38. Secondary Storage 30 includes machine-readable media such as hard disk drives, magnetic drum, and bubble memory. External Storage 32 includes machine-readable media such as floppy disks, removable hard drives, magnetic tape, CD-ROM, and even other computers, possibly connected via a communications line 28. The distinction drawn here between Secondary Storage 30 and External Storage 32 is primarily for convenience in describing the invention. As such, it should be appreciated that there is substantial functional overlap between these elements. Computer software such test programs, operating systems, and user programs can be stored in a Computer Software Storage Medium, such as memory 24, Secondary Storage 30, and External Storage 32. Executable versions of computer software 33, can be read from a Non-Volatile Storage Medium such as External Storage 32, Secondary Storage 30, and Non-Volatile Memory and loaded for execution directly into Volatile Memory, executed directly out of Non-Volatile Memory, or stored on the Secondary Storage 30 prior to loading into Volatile Memory for execution.

Figure 2:
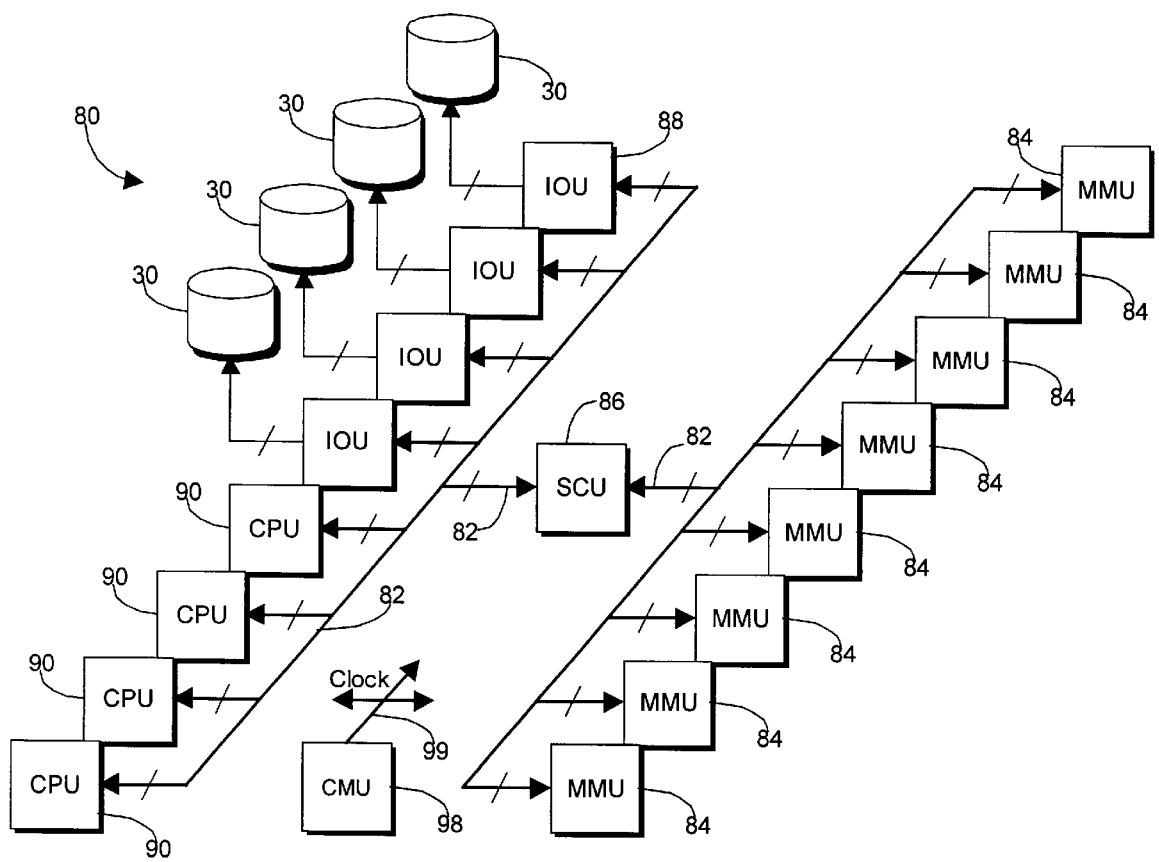
FIG. 2 is a block diagram of a more detailed view of a multiprocessor data processing system, in accordance with the present invention.

FIG. 2 is a block diagram of a more detailed view of a multiprocessor data processing system, in accordance with the present invention. The multiprocessor data processing system 80 comprises a plurality of modules coupled together via an intramodule bus 82 controlled by a storage control unit 86. In the preferred embodiment, each such module 84, 88, 90 is contained on a single board, with the boards connecting into a backplane. The backplane includes the intramodule bus 82. In the representative data processing system 80 shown in FIG. 2, sixteen modules are shown. The system includes four (4) processor ("CPU") modules 90, four (4) Input/Output ("IOU") modules 88, and eight (8) memory ("MMU") modules 84. Each of the four Input/Output ("IOU") modules 88 is shown coupled to secondary storage 30. This is representative of the function of such IOU modules 88. Each IOU module 88 will typically contain a plurality of IOU processors (not shown). Each of the eight memory modules 84 contains memory 24 and a memory controller (not shown). This memory 24 (see FIG. 1) is typically Dynamic Random Access Memory (DRAM). Large quantities of such memory 24 are typically supported. Also shown in FIG. 2 is a Clock Management Unit 98, which supplies a standard clock signal 99 to the remainder of the system 80. As clock signals are ubiquitous in digital computer architectures, the clock signal 99 will not be shown further herein except where relevant. Note also that in the preferred embodiment, multiple Clock Management Units 98 are utilized to provide a redundant clock signal 99.

Figure 3:
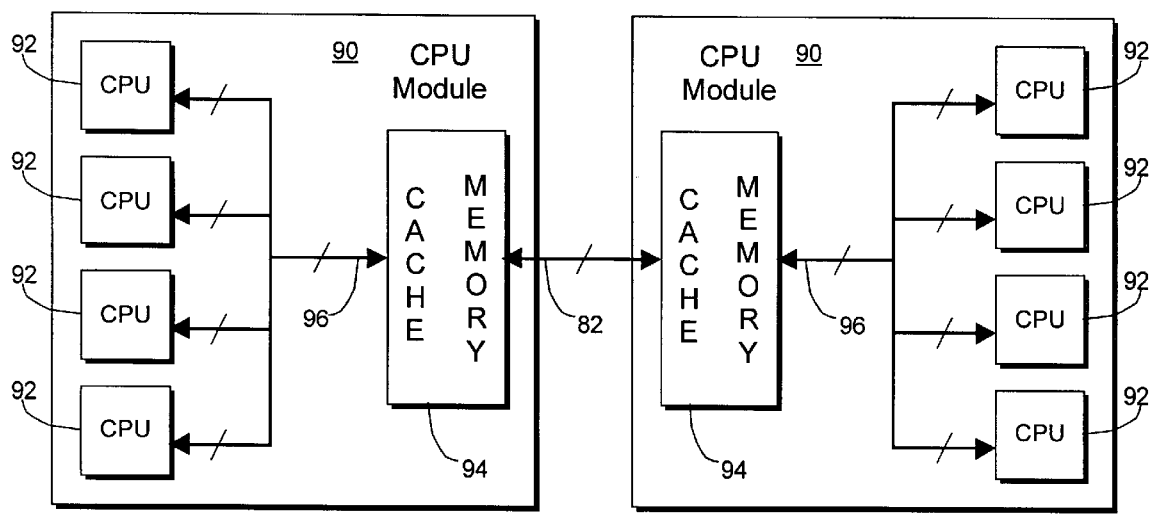
FIG. 3 is a block diagram illustrating a pair of processor (CPU) modules as shown in FIG. 2.

FIG. 3 is a block diagram illustrating a pair of processor (CPU) modules 90 as shown in FIG. 2. The two CPU modules 90 are coupled together and communicate over the intramodule bus 82. The CPU modules 90 each contain a plurality of processors (CPU) 92 and a Level 2 (L2) cache memory system 94 shared among the processors 92. In the preferred embodiment, each processor (CPU) module 90 contains up to four (4) processors (CPU) 92. The processors 92 and their L2 cache memory system 94 are coupled together and communicate over an intraprocessor bus 96.

The Level 2 (L2) cache memory system 94 is shared among the processors 92 in a CPU module 90. The L2 cache memory system 94 maintains cache copies of data loaded into those processors 92. The cache memory system 94 is considered here a Level 2 cache and is coupled to and communicates with the storage control system (SCU) 86 over the intramodule bus 82 in order to maintain cache coherency between Level 2 (L2) cache memories 94 in each of the processor (CPU) modules 90, as well as between cache Level 1 (L1) cache memories 256 in each of the processors 92, and on the IOU modules 88. The SCU 86 also maintains coherency between the various cache memories 94, 256, and the typically slower speed memory in the MMU modules 84. In the preferred embodiment, a single block of memory or cache line will be owned for update by a single cache or memory at potentially each level in the memory hierarchy. Thus, a given memory block or cache line may be owned by one Level 1 (L1) cache 256, by one Level 2 (L2) cache 94, and by one MMU 84. However note that a cache line can be held for read by multiple caches in the hierarchy.

Figure 4:
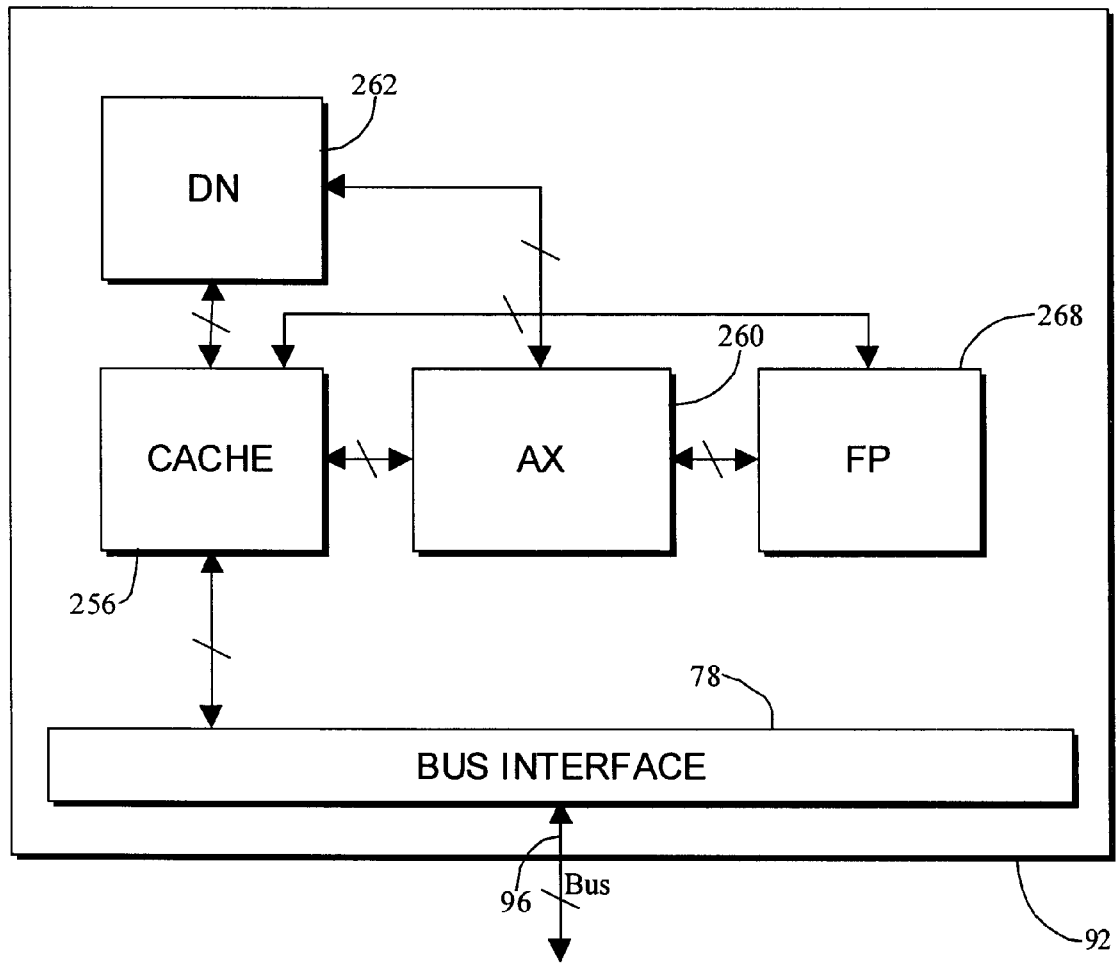
FIG. 4 is a block diagram of a processor shown in FIG. 3.

FIG. 4 is a block diagram of a processor 92 shown in FIG. 3. The processor 92 communicates with the bus 96 utilizing a bus interface 78. The bus interface is bidirectionally coupled to a unified local (level 1 or L1) cache 256. Cache memories, such as this unified local cache 256, are typically constructed as high speed Static Random Access Memories (SRAM). In the preferred embodiment, the local cache 256 is incorporated on the same integrated circuit as the remainder of the processor 92. The local cache 256 is the primary block that interfaces with the bus interface 78. Data and instructions are loaded via the bus 96 into the local cache 256, and data is written back from the local cache 256 via the bus 96. Implementations which separately cache instructions and data do not modify this embodiment.

The local cache 256 is bidirectionally coupled to an AX module 260. The AX unit 260 provides the bulk of the functionality of the processor 92, including instruction decode. The AX unit 260 is bidirectionally coupled to and controls execution of a floating point (FP) unit 268 and a decimal/numeric (DN) unit 262. In the preferred embodiment, the floating-point unit 268 performs both floating-point operations, and fixed-point multiplications and divisions. It is bidirectionally coupled to the local cache 256. The decimal/numeric (DN) unit 262 performs decimal and string operations. It is bidirectionally coupled to the local cache 256, allowing it to operate relatively autonomously from the AX unit 260. Rather, once decimal or string operations are initiated in the DN unit 262, the DN unit 262 is driven by operand availability in the local cache 256.

Figure 5:
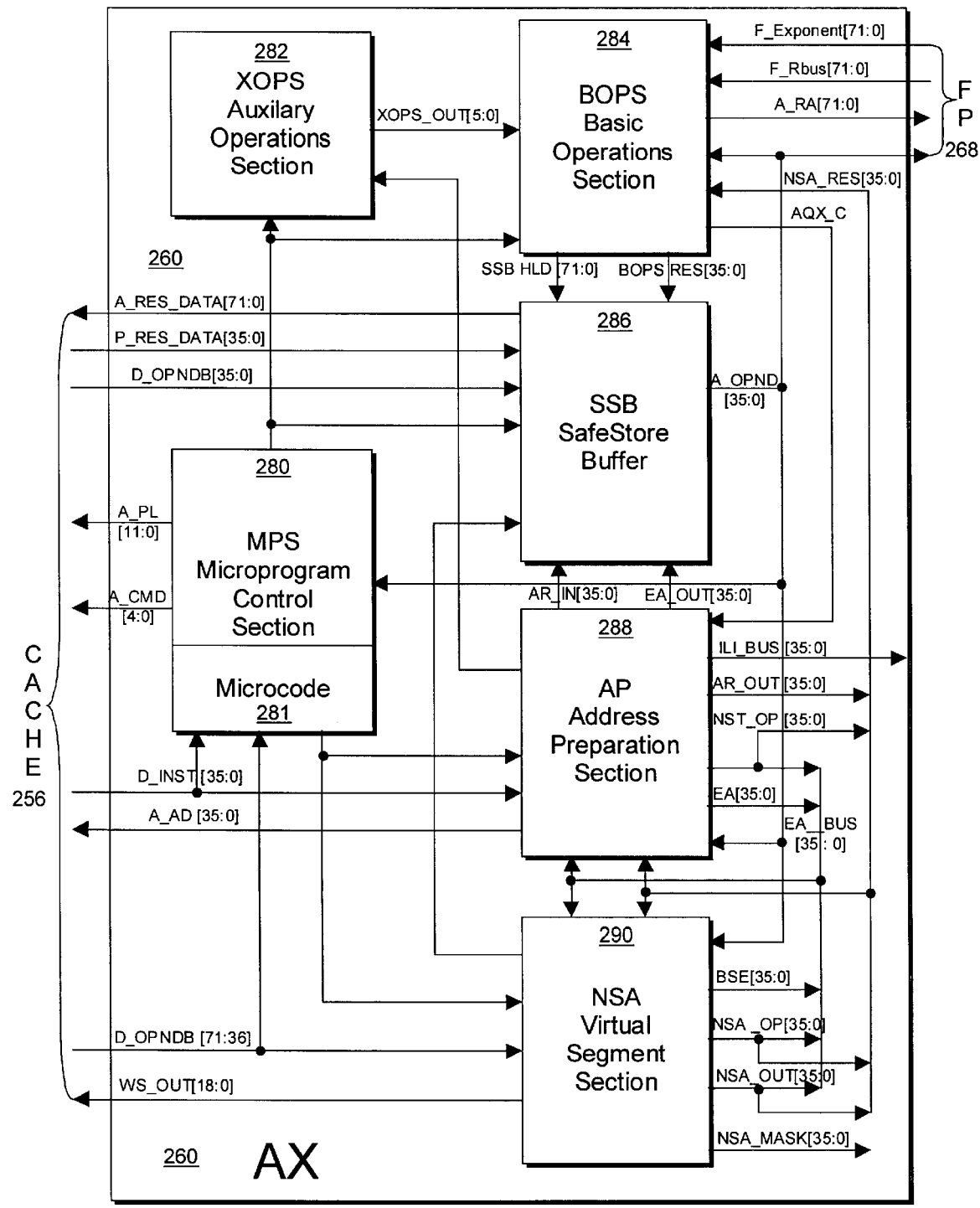
FIG. 5 is a block diagram of an AX unit in the processor shown in FIG. 4.

FIG. 5 is a block diagram of an AX unit 260 in the processor 92 shown in FIG. 4. The AX unit 260 comprises a Microprogram Control Section (MPS) unit 280, an Auxiliary Operations Section (XOPS) 282, a Basic Operations Section (BOPS) 284, a Safe Store Buffer (SSB) 286, an Address Preparation (AP) section 288, and a NSA Virtual Segment Section 290. The MPS 280 is bidirectionally coupled to and receives instructions from the local cache 256. The MPS 280 performs instruction decode and provides microprogram control of the processor 92. The microprogram control utilizes a microengine executing microcode 281 stored in both dynamic and static memories in response to the execution of program instructions. The MPS 280 is bidirectionally coupled to and controls operation of the Auxiliary Operations Section (XOPS) 282, the Basic Operations Section (BOPS) 284, the floating point (FP) unit 268, the decimal/numeric (DN) unit 262 (not shown here), the Address Preparation (AP) section 288, and the NSA Virtual Segment Section 290. The Basic Operations Section (BOPS) 284 is used to perform fixed point arithmetic, logical, and shift operations. The Auxiliary Operations Section (XOPS) 282 performs most other operations. The Address Preparation (AP) section 288 forms effective memory addresses utilizing virtual memory address translations. The NSA Virtual Segment Section 290 is bidirectionally coupled to and operates in conjunction with the AP section 288, in order to detect addressing violations.

The Safe Store Buffer (SSB) 286 stores the current status of the processor 92 environment, including user and segment registers, for the purpose of changing processor state.

The SSB 286 is coupled to and receives signals from the BOPS 284, the AP section 288, the MPS 280, and the NSA 290. The SSB 286 is bidirectionally coupled to the local cache 256, allowing SSB 286 frames to be pushed out to cache 256 when entering a new processor environment, and pulled back from cache 256 when returning to an old processor environment.

Returning to FIG. 3, in the preferred embodiment up to four processors 92 share a Level 2 or "L2" cache 94 in each processor (CPU) module 90. The L2 cache 94 caches lines of memory from the MMU modules 84. The access can be either read-only or read/write. In the case of read-only access, the L2 cache 94 line of memory may be a copy of the same cache line in another L2 cache 94. However, read/write access requires exclusive control of the block (or line) of memory. In the preferred embodiment, acquiring read/write access is termed "read-alter-rewrite" (RAR) access. If the cache line is not in a processor's L2 cache memory 94, but is rather located in another L2 cache memory 94 in another processor module 90, it is "siphoned" into the processor's L2 cache memory 94. The L2 caches 94 communicate across the system bus 82 utilizing a MESI bus protocol. This is described in more detail starting on page 168 of Pfister. The cache coherence architecture is similar to the snoopy cache architecture described starting at page 166 in Pfister. As noted above, "siphoning" is when one processor pulls a cache block or line into either its L1 cache memory 256, or its L2 cache memory 94.

In the prior art, whenever a processor 92 attempted to close a spin gate, it would acquire read/write (Read/Alter/Write or RAW) access to the block of memory containing the spin gate. Similarly, whenever a processor 92 would open a spin gate, it would also acquire read/write (or RAW) access to the block containing the spin gate. When a gate is in heavy use, multiple processors may repeatedly attempt to shut it while it is closed by yet another processor. Each such attempt to close the gate employs a read/write operation. This results in too much cache siphon activity since each gate test must acquire write permission to the cache line.

A first solution to these excessive gate siphons is to implement "friendly" gating. In "friendly" gating, a test is first made whether or not the spin gate is open. This gate "snooping" only requires read-only access to the block of memory or cache line containing the spin gate. A read-only copy of the cache line containing the gate can be made from the cache line in another cache memory 94, 256 and retained in the Level 1 (L1) cache 256 of the processor 92 until the cache line is updated by the opening processor 92. This update will cause the local read-only copy of cache line containing the gate to be invalidated. Then, if the spin gate is determined to be open, an attempt is made to actually close the spin gate. This requires read/write (RAW) access. This method significantly reduces the number of RAW cache siphons required since the RAW cache siphons are suppressed whenever the spin gate is determined by the gate "snoop" to be already closed.

Figure 6:
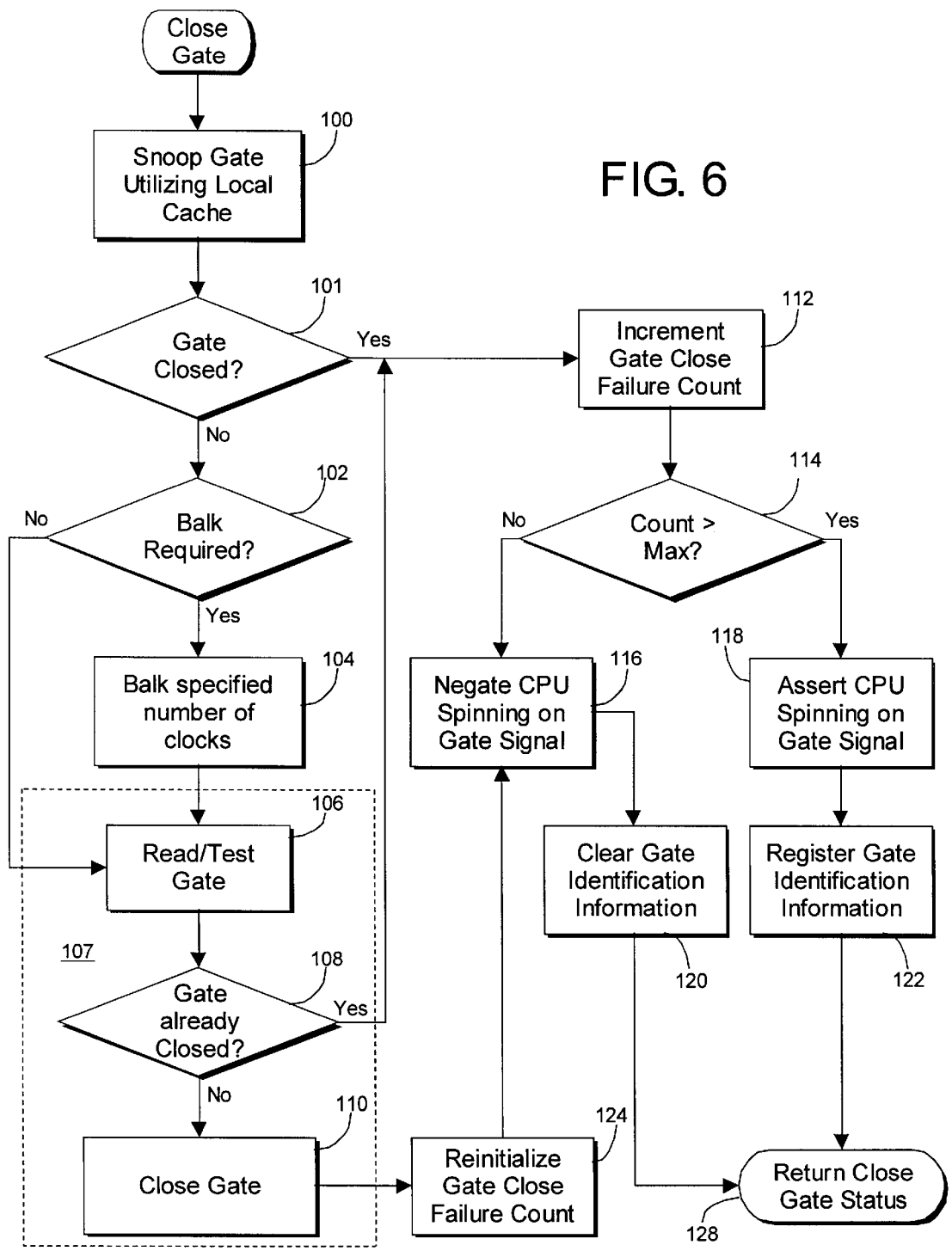
FIG. 6 is a flowchart illustrating operation of a spin gate "close", in accordance with the invention shown in FIG. 3.

FIG. 6 is a flowchart illustrating operation of a spin gate "close" or "lock", in accordance with the invention shown in FIG. 3. When the "close gate" function is entered, a local, possibly read-only, cache 256 copy of the spin gate is snooped or tested, step 100. A test is then made whether or not the gate is open or closed, step 101. If the gate is already closed, step 101, gate failure action is performed (see steps 112, 114, 116, 118, 120, 122 below) and a failure status is returned, step 128. This "friendly" gating or snooping eliminates the necessity of repeatedly getting write-access to the memory containing the spin gate, just to find out that the gate is still closed. Rather, a local cache copy of the memory containing the spin gate is tested until it is invalidated by the opening of the spin gate by another processor 92. This greatly eliminates cache siphon "ping-ponging" when multiple processors 92 are vying to close the same spin gate.

Otherwise, a test is made whether to "balk", step 102 (see FIG. 9 below). This typically tests whether a processor 92 in another processor module 90 is spinning on the gate. If a "balk" is required, step 102, the processor 92 attempting to close the gate "balks" for a specified delay time, step 104. The delay time is typically specified as a number of clock cycles, and as noted above, can typically be determined empirically, through simulation, or through experimentation. In either case, regardless of whether the processor 92 "balks", the spin gate is then read and tested as to whether it is currently closed, step 106. This requires read/write or RAW cache access to the cache block containing the spin gate. In the CC-NUMA rchitecture of the preferred embodiment, this may require an L2 cache 94 siphon from the L2 cache 94 on another CPU module 90. If the spin gate is not already closed, step 108, the spin gate is "closed", step 110. If the gate is closed successfully, step 110, a gate close failure count is reinitialized (typically zeroed), step 111, a CPU Spinning On Gate signal 62 (see FIG. 8) is negated, step 116, gate spinning identification information is cleared from the Spinning on Gate word 72, step 120, and a successful close gate status is returned, step 128. Steps 106, 108, and 110 are typically atomic 107.

In the situation where the gate is already closed, steps 101, 108, gate failure processing is performed. The gate close failure count is incremented, step 112. This gate close failure count is then tested against a maximum value, step 114. If the gate close failure count exceeds the maximum value, step 114, the CPU Spinning On Gate signal 62 is asserted, step 116, and gate identification information is registered for that processor in a Spinning on Gate word 72, step 122. Otherwise, the CPU Spinning On Gate signal 62 is negated, step 116, and the gate identification information is cleared from the Spinning on Gate word 72, step 120. In either case, a gate failure status is returned, step 128. In an alternative embodiment, only the actual spin gate close attempt failure, step 108, triggers the incrementing and testing of the gate close failure count, steps 112, 114, the asserting or negating of the CPU Spinning on Gate signal 62, steps 116, 118, the setting or clearing of the gate identification information in the Spinning on Gate word 72 for the processor 92, and not the "friendly" gating gate test, step 101.

In the preferred embodiment, the "close" function shown in steps 106, 108, and 110 this FIG. is implemented in the Set Zero and Negative indicators and Clear (SZNC) instruction which returns both a "Zero" and a "Negative" status. If the gate has been successfully closed, then the "Zero" indicator bit will be clear, indicating that the spin gate was "open" (and thus nonzero) when "closed" in step 110. In the case of a Test, Set, and Skip (TSS) type instruction as found in the Unisys 1100/2200 architecture, the gate status will be returned in step 112 by either skipping if the spin gate was successfully "closed", or not skipping if the "close" attempt failed. In systems that utilize compare-and-swap instructions for gating, the status returned in step 112 is typically set from the contents of the spin gate cell compared in memory before the compare-and-swap is executed. Other architectures and implementations are also within the scope of this invention.

The Close Spin Gate operation shown in FIG. 6 will typically be implemented as one or more hardware instructions. In the preferred embodiment, it is implemented primarily in software as a series of microcode instructions 281, with the exception of the read/test/write 106, 108, 110 operation that is atomic 107.

Figure 7:
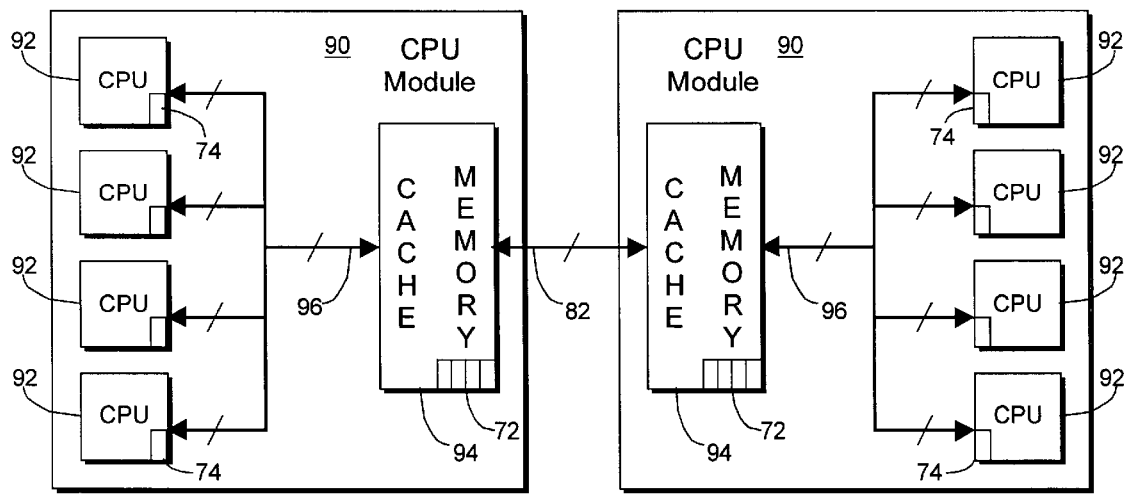
FIG. 7 is a block diagram illustrating a pair of processor (CPU) modules as shown in FIG. 2, in accordance with a preferred embodiment of the present invention.

FIG. 7 is a block diagram illustrating a pair of processor (CPU) modules 90 as shown in FIG. 2, in accordance with a preferred embodiment of the present invention. FIG. 7 is identical with FIG. 3 with the following additions. Each processor 92 has a corresponding Spinning on Gate word 72 in reserved memory. The Spinning on Gate words 72 for each of the processors 92 in a processor module 90 will typically be in the same block of reserved memory, so that they can all reside in the same line or block of cache memory 94, 256. The Spinning on Gate words 72 for other processor modules 90 will reside in other blocks of reserved memory, resulting in being stored in other, different, lines or blocks of cache memory 94, 256. When a processor 92 is trying to close a spin gate (see FIG. 6), the L1 cache memory 256 for that processor 92 will typically contain a local copy of a block containing the Spinning on Gate words 72 for each of the other processor modules 90 in the system 80. Whenever a processor 92 sets (step 122) or clears (step 120) its Spinning on Gate word 72, the read-only copies of the cache line or block containing the Spinning on Gate word 72 are invalidated in the processors 92 in the other processor modules 90, forcing them to siphon the new copy back into their cache memory 94, 256, when they in turn try to close a spin gate (FIG. 6).

Each processor 92 also has a Spinning on Gate latch 74 for each processor module 90 in the system 80 other than the processor module 90 containing that processor 92. A CPU Spinning on Gate signal 62 is asserted (step 118 in FIG. 6) whenever a processor 92 fails a predetermined number of times (steps 112, 114) to close a spin gate. In the preferred embodiment, this is done by transmitting a system bus command to the processors 92 in the other processor modules 90 on the system bus 82. This system bus command includes a command field value identifying this as a Spinning on Gate signal, and an identification of the processor 92 (or alternatively, the processor module 90 containing that processor 90) trying to close the spin gate. This signal is latched by the hardware in the Spinning on Gate latch 74. The Spinning on Gate latch 74 is tested by microcode firmware 281 to determine whether any processors 92 in the processor module 90 corresponding to the latch 74 are spinning trying to close a spin gate (see step 134 in FIG. 9), and selectively cleared by firmware when no processors 92 in that processor module 90 still have a spin gate registered in their corresponding Spinning on Gate word 72 (see step 142 in FIG. 9). This provides an efficient mechanism for determining whether or not to compare the Spinning on Gate words 72 for other processors 92 in other processor modules 90 against the gate being closed.

In the preferred embodiment, there will be one Spinning on Gate latch 74 for each other processor module 90 in the system 80. However, in an alternate embodiment, there will be a Spinning on Gate latch 74 for each Spinning on Gate word 72 (and thus processor 92) in the system 80. The Spinning on Gate latches 74 are formed into a single word or words, with one bit per processor 92. This provides an efficient mechanism for larger systems (such as for 32, 64, etc. processors 92) for detecting whether any processors 92 in the system 80 are spinning trying to close a spin gate by testing the entire word (or double word, etc.) at one time for zero. In one alternative, the bits corresponding to processors 92 in the processor module 90 containing the processor 92 testing the word (or words) of latches 74 are masked out before the word is tested for zero. Alternatively, the latch bits for those processors 92 in the same processor module 90 would never be set if the system bus commands indicating the Spinning on Gate signal 62 are not sent to those processors. In a further alternative, for even larger systems (such as for 128+ processors), Spinning on Gate latches 74 correspond to processor modules 90, but are combined into a word (or words) for efficient testing.

In an alternative embodiment, where processors 92 have a relatively large amount of control over their local cache memories 256, the actual Spinning On Gate signal 62 can in some systems be eliminated when a processor 92 is able to determine whether or not its cache memory 256 already contains a valid local copy of the cache line containing a set of Spinning on Gate words 72. Whenever the processor 92 determines that it needs to acquire a fresh cache copy of the Spinning on Gate words 72 for a processor module 90, after the cache line is acquired, the processor 92 tests each of the Spinning on Gate words 72 in the corresponding cache line for valid gate identifications, and sets or clears the corresponding Spinning on Gate latch 74 accordingly. The remainder of the time, it can utilize the corresponding Spinning on Gate latch 74 to expedite testing for other processors 92 spinning trying to close spin gates (see step 134 in FIG. 9).

Figure 8:
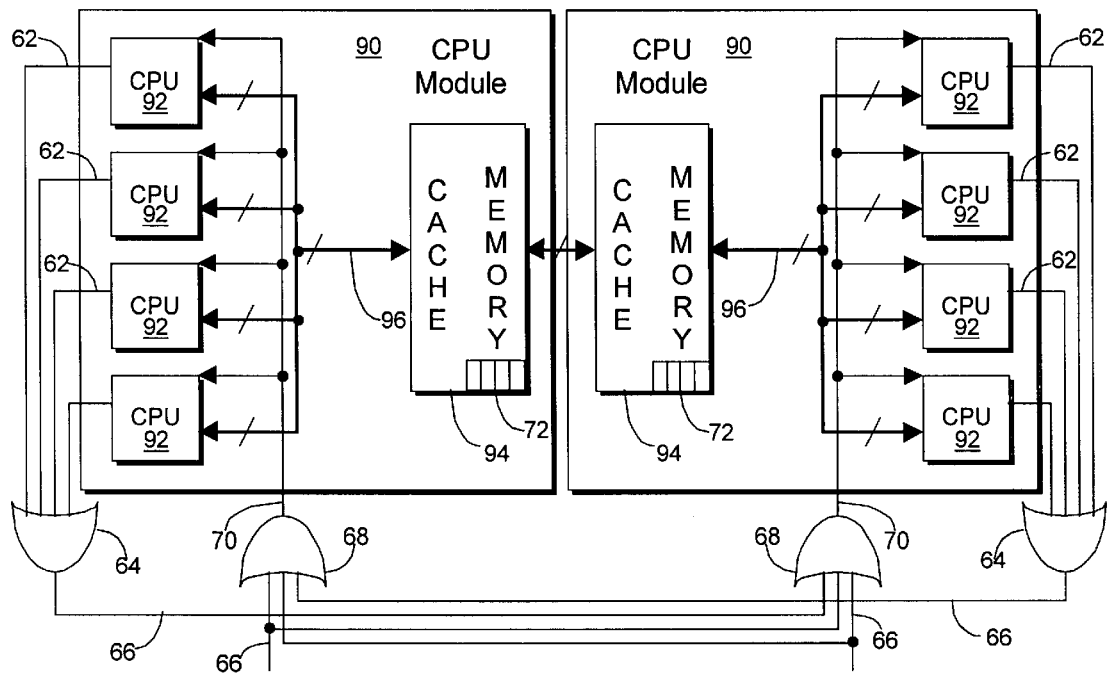
FIG. 8 is a block diagram illustrating a pair of processor (CPU) modules as shown in FIG. 2, in accordance with an alternate embodiment of the present invention.

FIG. 8 is a block diagram illustrating a pair of processor (CPU) modules 90 as shown in FIG. 2, in accordance with an alternate embodiment of the present invention. FIG. 8 is identical with FIG. 3 with the following additions. Each processor 92 provides a CPU Spinning On Gate signal 62. The CPU Spinning On Gate signal 62 is asserted whenever the processor 92 is spinning on attempting to close a spin gate (see steps 116 and 118 in FIG. 6). All of the CPU Spinning On Gate signals 62 for all of the processor 92 in a CPU module 90 are combined with a first OR gate 64. The output of the first OR gate 64 is a CPU Module Attempted Spin Gate Close signal 66. The CPU Module Attempted Spin Gate Close signals 66 for all of the processor (CPU) modules 90 in the system except that of the processor (CPU) module 90 generating the signal are combined with a second OR gate 68. The output of the second OR gate 68 provides an Other CPU Module Attempted Spin Gate Close signal 70 which is received by each of the processors 92 in that CPU module 90. This signal 70 is utilized to determine whether a processor 92 in another CPU module 90 is spinning on a spin gate in step 102 (see FIGS. 6 and 9).

Figure 9:
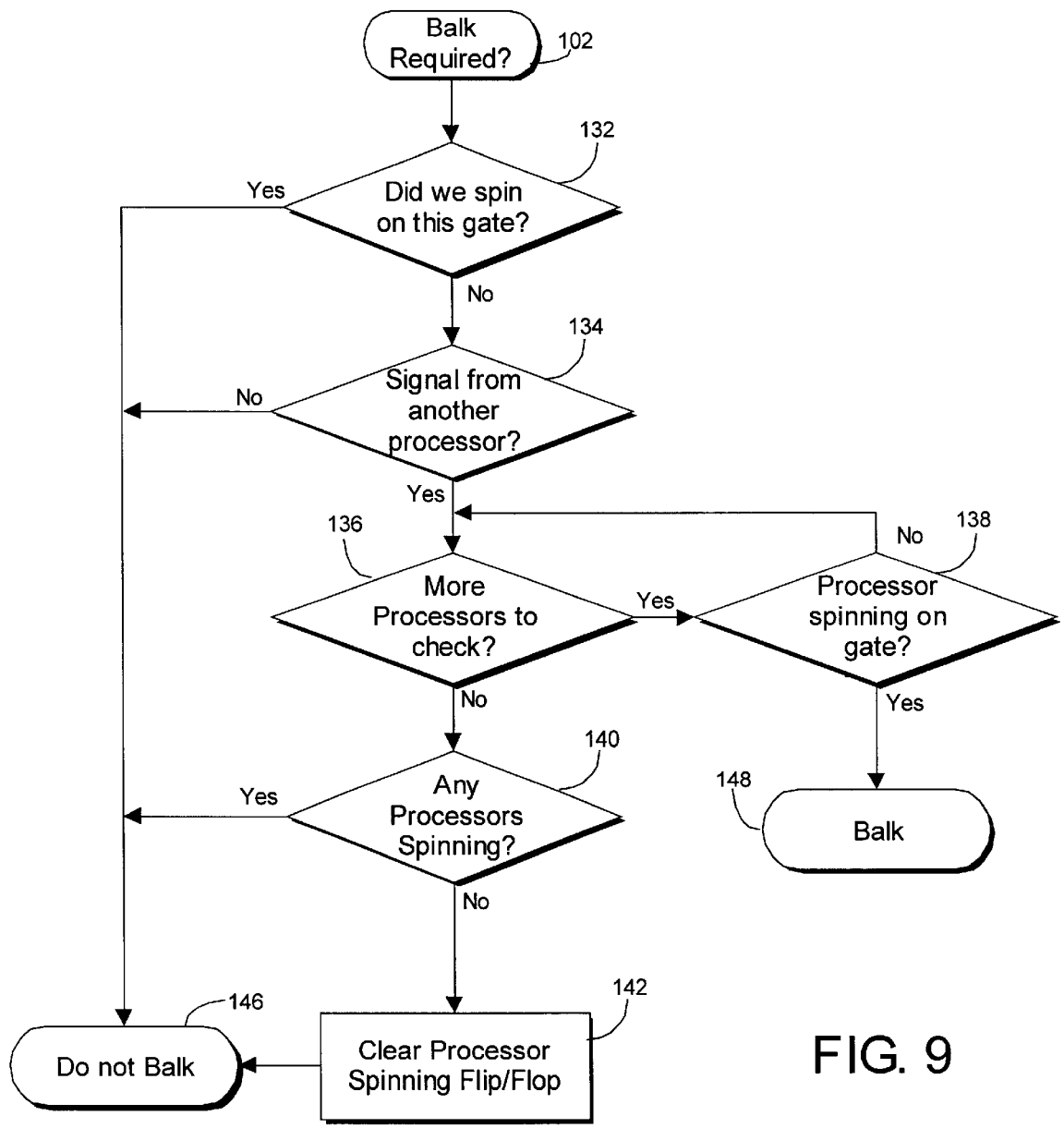
FIG. 9 is a flowchart of step 102 of FIG. 6 that determines whether a "Balk" is required.

FIG. 9 is a flowchart of step 102 of FIG. 6 that determines whether a "Balk" is required. It starts by testing whether this processor 92 was spinning trying to close this gate, step 132, sufficiently long to require that the processor 92 assert the Spinning on Gate signal, step 118, and register gate identification information in its Spinning on Gate word 72. If this processor 92 was spinning trying to close this gate, step 132, the balk is bypassed, step 146. Otherwise, a test is made whether a Spinning on Gate signal has been received from another processor 92 in another processor module 90, step 134. This is typically done by testing the Spinning on Gate latch 74 for that other processor module 90. However, in the alternative embodiment shown in FIG. 8, the Other CPU Module Attempted Spin Gate Close signal 70 is tested directly, if it is not latched. If no Spinning on Gate signal has been received (or the Spinning on Gate latch 74 is not set), the balk is bypassed, step 146.

When the Spinning on Gate signal has been received (or preferably if the Spinning on Gate latch 74 is set), step 146, each Spinning on Gate word 72 for the processor module 90 corresponding to the Spinning on Gate latch 74 is compared to the spin gate being closed to determine whether any processor 92 in that other processor module 90 is spinning trying to close this spin gate. A test is made whether there are more processors 92 to check, step 136. If there are more processors 92 to check, step 136, another Spinning on Gate word 72 for another processor 92 is checked against the spin gate being closed, step 138. If the Spinning on Gate word 72 being checked matches the spin gate being closed, a balk is performed, step 148. Otherwise, the process repeats, testing for another processor 92 to test, step 136. When no processors 92 remain to be tested, step 136, a test is made whether any processors 92 in that processor module 90 had Spinning on Gate words 72 that indicated they were currently spinning trying to close other spin gates, step 140. If no processors 92 in that processor module 90 indicate that they are currently spinning trying to close a spin gate, the Spinning on Gate latch 74 for that other processor module 74 is cleared, step 142. In either case, regardless of the result of the test in step 140, the "Balk" is bypassed, step 146.

The flowchart in FIG. 9 shows the processing for a single processor module 90. This was done for simplicity. As noted above in FIG. 7, the present invention includes support for larger numbers of processors 92, processor modules 90, and Spinning on Gate latches 74. The flowchart in FIG. 9 is modified accordingly to support more Spinning on Gate latches 74 and/or more processor modules 90 in the system 80.

In the preferred embodiment, the effective address of a spin gate is stored in the Spinning on Gate word 72 (see step 122 in FIG. 6) to identify the spin gate that a processor 92 is spinning trying to close. The effective address is computed by adding base and index registers, as appropriate, to the instruction address field. A virtual address is formed from the effective address by addition of a segment base address. A real page address is then formed through traversal and usage of page and segment tables. In alternative embodiments, any of these may be utilized to identify a spin gate. In another alternative, spin gates are numbered or otherwise uniquely identified, and this number or unique identification is stored in the Spinning on Gate word 72 to identify the spin gate that a processor 92 is attempting to close. In each embodiment, an illegal identification is stored in the Spinning on Gate word 72 (see step 120) to identify that a processor 92 is not spinning trying to close a spin gate. This value is zero in many embodiments. Alternatively, each Spinning on Gate word 72 can have (or contain) a valid bit indicating whether or not it contains a valid spin gate identifier.

Figure 10:
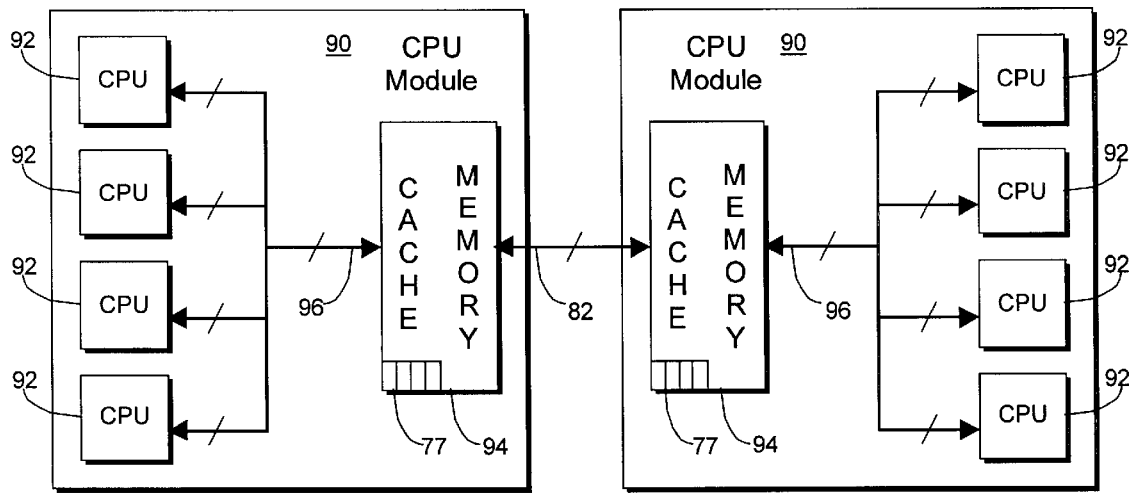
FIG. 10 is a block diagram illustrating a pair of processor (CPU) modules as shown in FIG. 2, in accordance with an alternate embodiment of the present invention.

FIG. 10 is a block diagram illustrating a pair of processor (CPU) modules 90 as shown in FIG. 2, in accordance with an alternate embodiment of the present invention. FIG. 10 is identical with FIG. 2 with the exception that an Open Gate shared memory area 77 is shown that contains identification for one or more spin gates recently closed by one of the processors 92 in a CPU module 90. In this FIG., the Open Gate shared memory area 77 is shown as part of the shared L2 cache memory 94. However, it may also be separate from the shared L2 cache memory 94. In the preferred embodiment, it is located in a reserved location in memory. Whenever a processor 92 opens a spin-gate (step 154 in FIG. 13), an Open Gate Word or location in the Open Gate shared memory area 76 is written with information identifying the spin gate just opened (step 156). In the preferred embodiment, this identification information is the address of the spin gate. As noted above, in the preferred embodiment, this is the effective address of the spin gate. However, other addresses or means of identifying the spin gate are also within the scope of this invention. Then, the locations in the Open Gate shared memory area 77 are matched against identification information for a spin gate being closed (step 152 in FIG. 12), and if there is a match, the processor 92 "balks" (step 104 in FIG. 12) in order to give processors 92 in other processor (CPU) modules 90 a fair chance at closing the spin gate.

Figure 11:
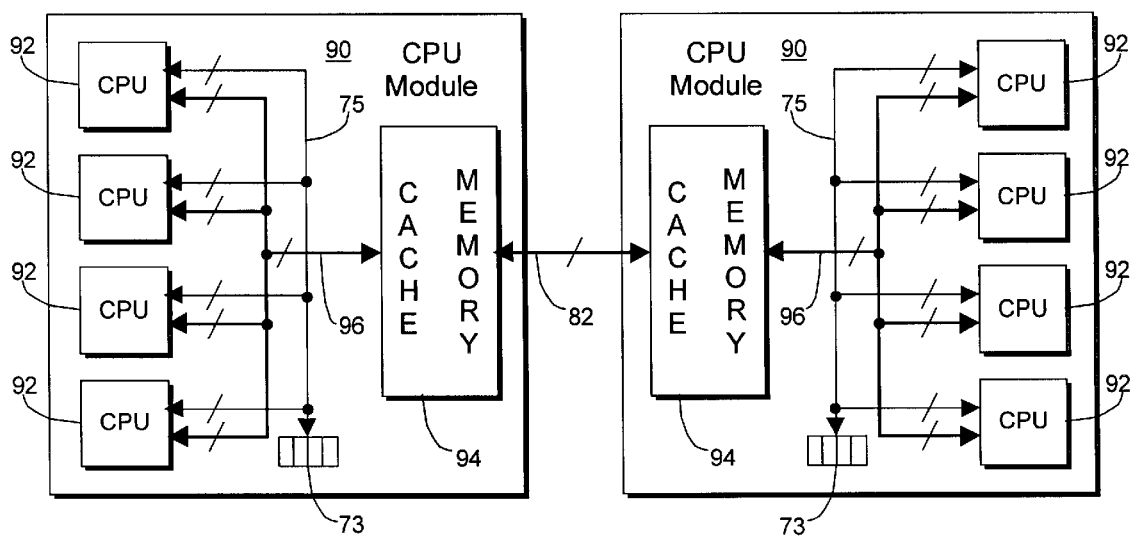
FIG. 11 is a block diagram illustrating a pair of processor (CPU) modules as shown in FIG. 2, in accordance with an alternate embodiment of the present invention.

FIG. 11 is a block diagram illustrating a pair of processor (CPU) modules 90 as shown in FIG. 2, in accordance with an alternate embodiment of the present invention. Each processor module 90 contains a set of registers, with one Open Gate register 73 for each processor 92 in the processor module 90. The Open Gate registers 73 are coupled to each processor 92 in the processor module 90 with an Open Gate bus 75. Note that though an Open Gate bus 75 is shown in this FIG., other circuitry providing similar or equivalent functionality is within the scope of this invention. In this embodiment, each processor 92 has direct write access to its own corresponding Open Gate registers 73, and has direct read access to each of the Open Gate registers 73 in the processor module 90 in which it resides.

Whenever a processor 92 opens a spin gate, the processor 92 writes the memory address (step 156 in FIG. 13) of that spin gate just opened into its Open Gate register 72. Then, whenever one of the processors 92 in that processor module 90 attempts to close a spin gate, the processor 92 compares the address of the spin gate to be closed against the spin gate addresses in the Open Gate registers 73 in that processor module 90 (step 152 in FIG. 12). If the address of the spin gate being closed is found in one of the Open Gate registers 73, the processor 92 trying to close the spin gate "balks" (step 104) or delays its RAW (Read/Write) cache request for the block containing the spin gate cell long enough that processors 92 in other processor modules 90 have a chance to acquire RAW access to the cache block containing the spin gate cell and to close the spin gate. This "balk" delay time can be empirically computed utilizing the various system cache delays, can be determined through simulation, or through experimentation.

FIG. 12 is a flowchart illustrating operation of a spin gate "close" or "lock", in accordance with the invention shown in FIGS. 10 and 11. When the "close gate" function is entered, a local, possibly read-only, cache 256 copy of the spin gate is snooped or tested, step 100. A test is then made whether or not the gate is open or closed, step 101. If the gate is already closed, step 101, this status is returned, step 128. This "friendly" gating or snooping eliminates the necessity of repeatedly getting write-access to the memory containing the spin gate, just to find out that the gate is still closed. Rather, a local cache copy of the memory containing the spin gate is tested until it is invalidated by the opening of the spin gate by another processor 92. This greatly eliminates cache siphon "ping-ponging" when multiple processors 92 are vying to close the same spin gate.

Otherwise, a test is made whether the spin gate being closed was opened by one of the processors 92 in the processor module 90 containing this processor 92, step 152. In this embodiment, this is done by comparing the address of the spin gate with the addresses in a list of gates opened by processors 92 in this processor module 90 stored in shared memory 77. Alternatively, the comparison is performed against Open Gate registers 73 for the processors 92 in that processor module 90.

One alternative improvement to this method is to age each of the Open Gate registers 73 in order to suppress "balking" (see step 104) when the gate "open" is not recent enough to have an effect on attempts in another processor module 90 to "close" the spin gate. One way of doing this is to clear each Open Gate memory location 77 or Open Gate register 73 a specified number of time clocks after being written (see step 156). This time delay can be determined similarly to that of the balk timeout value (see step 104). Another alternative is to clear each Open Gate memory 77 location or Open Gate register 73 after being read (step 152) a specified number of times (including once). Note here that both approaches "clear" the Open Gate memory 77 location or Open Gate register 73 for the matching processor 92. This is illustrative only. The important thing here is that the memory or register containing the spin gate identifier is invalidated, and thus other forms of invalidation are also within the scope of this invention.

If the spin gate was opened by a processor 92 in this CPU module 90, step 152, the processor 92 attempting to close the gate "balks" for a specified delay time, step 104. The delay time is typically specified as a number of clock cycles, and as noted above, can typically be determined empirically, through simulation, or through experimentation. In either case, regardless of whether the processor 92 "balks", the spin gate is then read and tested as to whether it is currently closed, step 106. This requires read/write or RAW cache access to the cache block containing the spin gate. In the CC-NUMA architecture of the preferred embodiment, this may require an L2 cache 94 siphon from the L2 cache 94 on another CPU module 90. If the spin gate is not already closed, step 108, the spin gate is "closed", step 110. In either case, regardless of whether the gate was already closed, step 108, the spin gate function then exits, returning a gate status, step 128. Steps 106, 108, and 110 are typically atomic 107.

In this embodiment, the "close" function shown in steps 106, 108, and 110 in this FIG. is implemented in the Set Zero and Negative indicators and Clear (SZNC) instruction which returns both a "Zero" and a "Negative" status. If the gate has been successfully closed, then the "Zero" indicator bit will be clear, indicating that the spin gate was "open" (and thus nonzero) when "closed" in step 110. In the case of a Test, Set, and Skip (TSS) type instruction as found in the Unisys 1100/2200 architecture, the gate status will be returned in step 112 by either skipping if the spin gate was successfully "closed", or not skipping if the "close" attempt failed. In the case of compare-and-swap instructions, the status returned in step 112 is typically set from the contents of the spin gate cell compared in memory before the compare-and-swap is executed. Other architectures and implementations are also within the scope of this invention.

FIG. 12 can be seen as illustrating two different inventions. First, there is the "balking" when the spin gate has recently been opened by a processor 92 in this processor (CPU) module 90. This is shown in steps 152, 104, and 107. Secondly, there is the "friendly" spin gate "close" discussed above. This is shown in steps 100 and 101.

The Close Spin Gate operation shown in FIG. 12 will typically be implemented as one or more hardware instructions. In the preferred embodiment, it is implemented primarily in software as a series of microcode instructions 281, with the exception that the read/test/write 106, 108, 110 operation is atomic 107.

FIG. 13 is a flowchart illustrating operation of a spin gate "open" or "unlock", in accordance with the invention shown in FIGS. 10 and 11. First, the spin gate is "opened", step 154. In the preferred embodiment, this is done by executing a "STC2" instruction that stores the current program counter address (plus 2) into the spin gate cell in memory. In other architectures other values, such as zero or one are stored into the spin gate cell in memory in order indicate that the spin gate is now "open". The address of the spin gate or any other information identifying the spin gate is then stored in the spin gate shared memory area 77 (FIG. 10) or register 73 (FIG. 11) for the processor 92 opening the spin gate, step 156. The status of the "open" of the spin gate is then returned, step 158. It should be noted that though steps 154 and 156 are shown in a certain order in this FIG., there is no real-time dependence between these steps. In modern superscaler processors, thus these steps will typically be implemented as hardware operations executed essentially in parallel by the processor 92.

Those skilled in the art will recognize that modifications and variations can be made without departing from the spirit of the invention. Therefore, it is intended that this invention encompasses all such variations and modifications as fall within the scope of the appended claims.

Claim elements and steps herein have been numbered and/or lettered solely as an aid in readability and understanding. As such, the numbering and/or lettering in itself are not intended to and should not be taken to indicate the ordering of elements and/or steps in the claims.

What is claimed is:

1. A method of closing a gate in a data processing system having a plurality of processors in a plurality of processor modules, said method comprising:
   (A) testing whether a processor in a subject processor module opened the gate by:
      1) selecting a first processor in the subject processor module as a selected processor;
      2) testing an address of the gate against the contents of a gate opened location in a memory associated with a selected processor in the subject processor module; and
      3) repeating substep (2) as a loop while the address of the gate does not match the selected gate opened location and another processor in the subject processor module as the selected processor has not been tested in substep (2);
   (B) balking a specified period of time when the address of the gate matches the contents of the selected gate opened location; and
   (C) attempting to close the gate after balking in step (B).

2. A method of closing a gate in a data processing system having a plurality of processors in a plurality of processor modules, said method comprising:
   (A) testing whether a processor in a subject processor module opened the gate by:
      1) selecting a first processor in the subject processor module as a selected processor;
      2) selecting a Spinning on Gate location in a memory associated with the selected processor in the other processor module as a selected Spinning on Gate location;
      3) testing an address of the gate against the contents of the selected Spinning on Gate location; and
      4) repeating substeps (2) and (3) as a loop while the address of the gate does not match the selected Spinning on Gate location and another processor in the other processor module as the selected processor has not been tested in substep (2);
   (B) balking a specified period of time when the address of the gate matches the contents of the Spinning on Gate location; and
   (C) attempting to close the gate after balking in step (B).

3. The method in claim 2 wherein:
   step (A) further comprises:
      3) receiving an Other CPU Module Attempted Spin Gate Close signal from a second processor in the other processor module that the second processor in the other processor module is trying to close a gate, 4) testing whether the Other CPU Module Attempted Spin Gate Close signal has been received, and
5) skipping substeps (1), (2), (3), and (4) when the Other CPU Module Attempted Spin Gate Close signal has not been received; and balking in step (B) is skipped when the Other CPU Module Attempted Spin Gate Close signal has not been received.

4. The method in claim 3 wherein:

the Other CPU Module Attempted Spin Gate Close signal is latched in a Spinning on Gate latch; and the testing in substep (5) tests the Spinning on Gate latch.

5. The method in claim 3 wherein:

the Other CPU Module Attempted Spin Gate Close signal is provided as a system bus command.

6. The method in claim 3 wherein:

the Other CPU Module Attempted Spin Gate Close signal is provided as a direct signal.

7. The method in claim 2 wherein:

step (A) comprises:
1) receiving an Other CPU Module Attempted Spin Gate Close signal from a processor in the other processor module that the processor in the other processor module is trying to close a gate, and
2) testing whether the Other CPU Module Attempted Spin Gate Close signal has been received; and balking is performed in step (B) when the Other CPU Module Attempted Spin Gate Close signal has been received.

8. The method in claim 2 which further comprises:

(D) detecting when a first processor in a first processor module is spinning trying to close the gate; and (E) notifying a second processor in a second processor module when the first processor detects in step (D) that it is spinning trying to close a gate.

9. The method in claim 8 wherein:

the notifying in step (E) comprises:
transmitting a CPU Spinning On Gate signal over a bus to the second processor as a system bus command.

10. The method in claim 8 wherein:

the notifying in step (E) comprises:
asserting a CPU Spinning On Gate signal on a CPU Spinning On Gate signal line coupled to the second processor.

11. The method in claim 8 wherein:

the notifying in step (E) comprises:
writing an identification of the gate into a Spinning on Gate location in a memory.

12. The method in claim 11 wherein:

the notifying in step (E) further comprises:
transmitting a CPU Spinning On Gate signal to the second processor.

13. The method in claim 8 wherein:

step (D) comprises:
1) counting a number of times that the first processor attempted to close the gate, and
2) comparing the number of times against a prespecified limit; and the first processor is determined to be spinning trying to close the gate when the number of times exceeds the prespecified limit.

* * * * *